US008216356B2

(12) United States Patent
Nishikawa

(10) Patent No.: US 8,216,356 B2
(45) Date of Patent: Jul. 10, 2012

(54) INK SET FOR INK JET, INK JET COLORING PROCESS AND COLORED PRODUCT FOR OUTDOOR

(75) Inventor: Tomoyuki Nishikawa, Fukui (JP)

(73) Assignee: Seiren Co., Ltd., Fukui-ken (JP)

( * ) Notice: Subject to any disclaimer, the term of this patent is extended or adjusted under 35 U.S.C. 154(b) by 1019 days.

(21) Appl. No.: 12/219,640

(22) Filed: Jul. 25, 2008

(65) Prior Publication Data

US 2009/0029119 A1    Jan. 29, 2009

(30) Foreign Application Priority Data

Jul. 27, 2007    (JP) .................................. 2007-196530

(51) Int. Cl.
*C09D 11/02* (2006.01)
(52) U.S. Cl. ..................... 106/31.9; 106/31.6; 106/31.65
(58) Field of Classification Search ................. 106/31.6, 106/31.65, 31.9
See application file for complete search history.

(56) References Cited

FOREIGN PATENT DOCUMENTS

| JP | 2004-055530 | 2/2001 |
|---|---|---|
| JP | 2004-107633 | 4/2004 |
| JP | 2004-107637 | 4/2004 |

*Primary Examiner* — David W Wu
*Assistant Examiner* — Vu A Nguyen
(74) *Attorney, Agent, or Firm* — Antonelli, Terry, Stout & Kraus, LLP.

(57) ABSTRACT

An object of the present invention is to provide an ink set for ink jet capable of obtaining printed articles superior in warm color representation and weather resistance, an ink jet coloring process and a colored product for outdoor. An ink set for ink jet containing an orange pigment ink (a) and a red pigment ink (b) wherein the orange pigment ink (a) includes iron oxide serving as an orange pigment and a solvent, and the red pigment ink (b) includes iron oxide serving as said red pigment; at least one of a pigment selected from condensed polycyclic compound pigments, said at least one of a pigment serving as said red pigment; and a solvent.

7 Claims, 1 Drawing Sheet
(1 of 1 Drawing Sheet(s) Filed in Color)

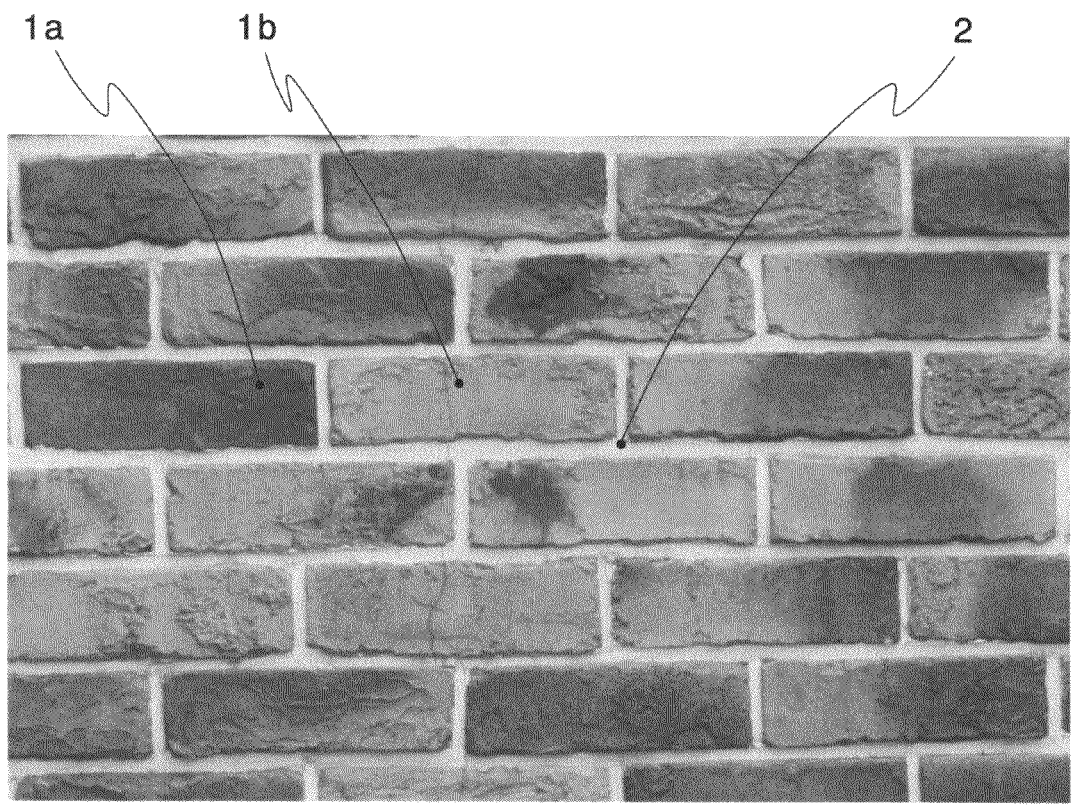

INK SET FOR INK JET, INK JET COLORING PROCESS AND COLORED PRODUCT FOR OUTDOOR

BACKGROUND OF THE INVENTION

The present invention relates to an ink set for ink jet, an ink jet coloring process using thereof, and a colored product for outdoor obtained by the process. More specifically, the present invention relates to an ink set for ink jet superior in warm color representation and weather resistance, an ink jet coloring process and a colored product for outdoor.

Although ink jet printing has been conventionally studied as a coloring process for various materials, excellent weather resistance capable of corresponding to all natural conditions is required in case that the material is employed for outdoor use. The weather resistance is property in which an image printed on a material is retained without change in color and color degradation for a fixed period even if it is exposed to heat, light and water, and various trials have been carried out for an ink jet ink for printed articles used out of doors.

Organic pigments more superior in weather resistance than a dye are proposed as a coloring agent for an ink jet ink (for example, Japanese Unexamined Patent Publication No. 2004-107633 and Japanese Unexamined Patent Publication No. 2004-107637). However, since they are exposed to sunlight for a long period in outdoor use, it is difficult to prevent color degradation when an organic pigment is used. In case of outdoor use, there has been required weather resistance in which color degradation occurs hardly for 5 to 10 years out of doors usually and after exposure to heat, light and water.

Accordingly, an ink for ink jet using an inorganic pigment superior in weather resistance than an organic pigment as a coloring agent is proposed (for example, Japanese Unexamined Patent Publication No. 2001-055530). However, although the inorganic pigment is superior in weather resistance, it is often inferior in coloring ability and sharpness in comparison with the organic pigment. Although there are those having coloring ability and sharpness even among the inorganic pigments, these include harmful substances such as mercury, lead, cadmium and chromium and should not be used considering influence to a human body and environments.

On the other hand, warm color representation such as brick tone and woodgrain has been required in building materials such as a siding material used out of doors; therefore, colors such as orange, brown and brick red color are often used. In the warm color representation, dense orange color is particularly required for abundant density representation. However, even if a yellow inorganic pigment and a red inorganic pigment are used, there has been a problem that orange color with chroma saturation and density tone is not obtained.

Thus, it is status quo that there has not been developed yet an ink set for ink jet capable of providing printed articles superior in weather resistance for a material for outdoor use such as a siding material and capable of providing color representation in brick tone and woodgrain and in particular, capable of providing warm color representation such as orange color with chroma saturation and density tone.

SUMMARY OF THE INVENTION

According to the ink set of the present invention, color representation in brick tone and woodgrain can be provided for a material for outdoor use such as a siding material. Further, there can be obtained a colored product for outdoor uses superior in warm color representation often used in a siding material, in particular, representation such as dense orange color, brown color and brick color and superior in weather resistance.

In view of the above-described circumstances, an object of the present invention is to provide an ink set for ink jet superior in warm color representation and weather resistance, an ink jet coloring process and a colored product for outdoor.

It has been found that warm color representation such as orange color, brown color and brick color with chroma saturation and density tone can be carried out by combination of specific pigments for the above-mentioned problems and further, very superior weather resistance can be provided, and the object of the present invention has been attained by the composition below. Namely, the present invention is the following ink set for ink jet, the ink jet coloring process and the colored product for outdoor.

1) An ink set for ink jet containing an orange pigment ink (a) and a red pigment ink (b) wherein the orange pigment ink (a) includes iron oxide (herein, iron oxide indicates $Fe_2O_3$, and hereinafter, same as above) being an orange pigment and a solvent, and the red pigment ink (b) includes iron oxide serving as said red pigment; at least one of a pigment selected from condensed polycyclic compound pigments, said at least one of a pigment serving as said red pigment; and a solvent.

2) The ink set for ink jet of the above-described 1), wherein the iron oxide serving as an orange pigment is C. I. Pigment Red 101.

3) The ink set for ink jet of the above-described 1) or 2), wherein the average particle diameter of the iron oxide serving as an orange pigment is 10 to 90 nm.

4) The ink set for ink jet of any one of the above-described 1) to 3), wherein the iron oxide serving as an red pigment is C. I. Pigment Red 101 and C. I. Pigment Red 102, and the condensed polycyclic compounds serving as the red pigment are C. I. Pigment Red 149, C. I. Pigment Red 168, C. I. Pigment Red 178, C. I. Pigment Red 179, C. I. Pigment Red 190, C. I. Pigment Red 224, C. I. Pigment Red 242, C. I. Pigment Red 254, C. I. Pigment Red 255, C. I. Pigment Red 270 and C. I. Pigment Red 272.

5) The ink set for ink jet of any one of the above-described 1) to 4) to form an image, wherein the solvent is a reactive monomer and/or a reactive oligomer.

6) An ink jet coloring process, wherein a pattern is formed in a coloring medium using the ink set for ink jet of any one of the above-described 1) to 5).

7) A colored product for outdoor, which is obtained by using the ink jet coloring process of the above-described 6).

BRIEF DESCRIPTION OF THE DRAWING

The patent or application file contains at least one drawing executed in color. Copies of this patent or patent application publication, with color drawing will be provided by the Office upon request and payment of the necessary fee.

FIG. 1 is a diagram showing a colored pattern obtained by using the ink set of the present invention, discharging an ink on a ceramic plate and printing a brick pattern.

EXPLANATION OF SYMBOLS

1a . . . One brick
1b . . . One brick
2 . . . Joint being boundary between bricks

DETAILED DESCRIPTION

The orange pigment ink (a) and the red pigment ink (b) used for the ink set for ink jet of the present invention use specific pigments respectively. The orange pigment ink of the present invention means a pigment in which the hue angle h of the L*C*h color system is within a range of 40° to 80° and preferably 50° to 75° when an amount of a pigment to be provided to a coloring medium is 0.1 to 5 g/m². Further, the red pigment ink of the present invention means a pigment in which the hue angle h is within a range of 340° to 360° and 0° to 35°, and preferably 350° to 360° and 0° to 30° when an amount of a pigment to be provided to a coloring medium is 0.1 to 5 g/m².

Herein, the L*C*h color system is based on the L*a*b* color system (JIS Z 8729), L* represents lightness, C* represents a chroma saturation and h represents a hue angle. When an axis to an a* red direction in the chromaticity diagram of the L*a*b* color system is set at 0°, h is an angle moving against hue to a counterclockwise direction using the a* axis as a basis and the position of color can be grasped by the angle. When h is 0°, it represents red, 90° represents yellow, 180° represents green, and 270° represents blue. Further, when C* is a larger value in the chromaticity diagram of the L*a*b* color system, brightness increases more, and when C* is a smaller value, it means that the color is duller color.

The orange pigment ink (a) includes at least iron oxide serving as an orange pigment. The iron oxide is preferably C. I. Pigment Red 101. The C. I. Pigment Red 101 has characteristics, in which hue is changed depending on its particle diameter, and when the particle diameter is small, it exhibits yellowish tint, and when the particle diameter is large, it exhibits purplish tint.

The iron-oxide serving as an orange pigment has preferably an average particle diameter of 10 to 90 nm, and more preferably 30 to 80 nm in order to obtain printed articles with chroma saturation and density tone by carrying out color mixing with the red pigment ink (b). When the average particle diameter is less than 10 nm, coloring tends to be weak, and when it exceeds 90 nm, reddish tint is strengthened, therefore, orange color with chroma saturation and density tone does not tend to be obtained.

In the present invention, the average particle diameter is measured as follow. The pigment is photographed by a transmission electron microscope and the particle diameters (long axis) of 100 primary particles of the pigment photographed are measured. The average value of the obtained particle diameters is referred to as the average particle diameter.

The red pigment ink (b) includes the iron oxide serving as a red pigment and at least one of a pigment selected from condensed polycyclic compound pigments serving as a red pigment. The iron oxide serving as a red pigment is preferably C. I. Pigment Red 101 and C. I. Pigment Red 102.

The average particle diameter of the above-described iron oxide serving as a red pigment is preferably 100 to 300 nm and more preferably 100 to 200 nm in order to obtain printed articles in orange color with chroma saturation and density tone by carrying out color mixing with orange pigment ink. When the average particle diameter is less than 100 nm, yellowish tint is strengthened, therefore, the orange color with chroma saturation and density tone does not tend to be obtained. When the average particle diameter exceeds 300 nm, bluish tint is strengthened and color is purple, therefore, the orange color with chroma saturation and density tone does not tend to be obtained. Further, since density is large and it is easily precipitated, discharge from a nozzle tends to be difficult.

The condensed polycyclic compound pigments are preferably C. I. Pigment Red 149, C. I. Pigment Red 168, C. I. Pigment Red 178, C. I. Pigment Red 179, C. I. Pigment Red 190, C. I. Pigment Red 224, C. I. Pigment Red 242, C. I. Pigment Red 254, C. I. Pigment Red 255, C. I. Pigment Red 270 and C. I. Pigment Red 272 from the viewpoints of having coloring ability and being bright.

Among these, C. I. Pigment Red 149, C. I. Pigment Red 178 and C. I. Pigment Red 179 are more preferable from the viewpoint of being superior in weather resistance.

The above-described condensed polycyclic compound pigments are organic pigments, form a crystal structure in which molecules are overlapped, and are stable as macro molecules by hydrogen bonding among multi molecules of the pigments. Therefore, the pigments are most superior in weather resistance among organic pigments and are pigments hardly discolored even at outdoor use. The average particle diameter of the condensed polycyclic compound pigments used in the present invention is preferably 30 to 300 nm, and more preferably 50 to 200 nm. When the average particle diameter is less than 30 nm, weather resistance tends to be weakened and when it exceeds 300 nm, discharge from an ink jet nozzle tends to be difficult.

The condensed polycyclic compound pigments can be mixed with the orange pigment ink (a) to prepare the red pigment ink (b). In this case, a weight ratio of the iron oxide serving as an orange pigment included in the orange pigment ink (a) to the condensed polycyclic compound pigments to be mixed is preferably 90:10 to 50:50.

Thus, since the red pigment ink (b) includes the iron oxide and/or the condensed polycyclic compound pigments, color mixing with the orange pigment ink (a) is carried out to be able to obtain orange color with chroma saturation and density tone.

The ink set for ink jet of the present invention can be an ink set using an ink containing blue organic pigments such as phthalocyanine compounds (C. I. Pigment Blue 15, C. I. Pigment Blue 15:1, C. I. Pigment Blue 15:2, C. I. Pigment Blue 15:3, C. I. Pigment Blue 15:4, C. I. Pigment Blue 15:6 and C. I. Pigment Blue 16), blue inorganic pigments such as iron blue (C. I. Pigment Blue 27), cobalt blue (C. I. Pigment Blue 28 and C. I. Pigment Blue 36) and ultramarine blue (C. I. Pigment Blue 29), black inorganic pigments such as carbon black (C. I. Pigment Black 7), white inorganic pigments such as titanium oxide (C. I. Pigment White 6), yellow inorganic pigments such as bismuth vanadate (C. I. Pigment Yellow 184), yellow iron oxide (C. I. Pigment Yellow 42), and yellow organic pigments such as azo methine compounds (C. I. Pigment Yellow 129 and C. I. Pigment Yellow 150) in combination.

The pigments included in the orange pigment ink (a) and the red pigment ink (b) are preferably contained in an amount of 0.1 to 15 parts by weight in 100 parts by weight of respective inks, and more preferably contained in an amount of 0.5 to 5 parts by weight. When the content of the pigment is less than 0.1 part by weight, the density of the ink tends to be insufficient, and when it exceeds 15 parts by weight, discharge from a nozzle tends to be difficult.

Surprisingly, when the orange pigment ink (a) and the red pigment ink (b) including the above-described specific pigments are combined as an ink set to be used, the orange color obtained is superior in chroma saturation and density tone in comparison with orange color represented by using usual yellow ink and magenta ink and further, printed articles obtained have excellent weather resistance. Further, since the pigments used in the present invention respectively have light resistance, the printed articles obtained by using these pigments have light resistance balance. Namely, even if they are placed under sunlight, only specific color is not extremely discolored in the printed articles, and the color can be kept as the whole printed articles without discoloring pattern. Further, the orange pigment ink (a) and the red pigment ink (b) can be used as an ink set in combination with a blue pigment ink made of the above-described blue organic pigments such as phthalocyanine compounds (C. I. Pigment Blue 15, C. I. Pigment Blue 15:1, C. I. Pigment Blue 15:2, C. I. Pigment Blue 15:3, C. I. Pigment Blue 15:4, C. I. Pigment Blue 15:6 and C. I. Pigment Blue 16), blue inorganic pigment ink comprising blue inorganic pigments such as iron blue (C. I. Pigment Blue 27), cobalt blue (C. I. Pigment Blue 28 and C. I. Pigment Blue 36) and ultramarine blue (C. I. Pigment Blue 29), and/or black inorganic pigments such as carbon black (C. I. Pigment Black 7).

Herein, the weather resistance in pigments indicates resistance to sunlight (light resistance) in particular, and means that they are hardly discolored after exposure out of doors for 5 to 10 years. The weather resistance can be confirmed in a short period using testers such as, for example, a sunshine weatherometer, a metal weather and a super UV.

The solvent used in the present invention includes water, an organic solvent, a reactive monomer and/or a reactive oligomer, and among these, the reactive monomer and/or the reactive oligomer is preferable.

The reactive monomer and reactive oligomer are not specifically limited, are cured by irradiation of ultraviolet rays, and are so-called an ultraviolet curing resin. Since the ultraviolet curing resin has characteristics that the resin is cured immediately by irradiation of the ultraviolet rays, it has a merit that an ink-receiving layer is not required for a recording substrate, and its cured article is superior in adhesiveness with the substrate.

The reactive monomer includes, for example, hexa-functional acrylates such as dipentaerythritol hexaacrylate and a modified product thereof; penta-functional acrylates such as dipentaerythritolhydroxy pentaacrylate; tetra-functional acrylates such as pentaditrimethylolpropane tetraacrylate and pentaerythritol tetraacrylate; trifunctional acrylates such as trimethylolpropane triacrylate, pentaerythritol triacrylate, tris(2-hydroxyethyl)isocyanurate triacrylate and glyceryl triacrylate; difunctional acrylates such as hydroxypyvalic acid neopentylglycol diacrylate, polytetramethylene glycol diacrylate, trimethylolpropane acrylic acid benzoate, diethylene glycol diacrylate, triethylene glycol diacrylate, tetraethylene glycol diacrylate, polyethylene glycol (200) diacrylate, polyethylene glycol (400) diacrylate, polyethylene glycol (600) diacrylate, neopentyl glycol diacrylate, 1,3-butanediol diacrylate, 1,4-butanediol diacrylate, 1,6-hexanediol diacrylate, 1,9-nonanediol diacrylate, dimethylol-tricyclodecane diacrylate and bisphenol A diacrylate; and monofunctional acrylates such as caprolactone acrylate, tridecyl acrylate, isodecyl acrylate, isooctyl acrylate, isomyristyl acrylate, isostearyl acrylate, 2-ethylhexyl diglycol acrylate, 2-hydroxybutyl acrylate, 2-acrylolyloxyethyl hexahydrophthalate, neopentylfuricol acrylic acid benzoate, isoamyl acrylate, lauryl acrylate, stearyl acrylate, butoxyethyl acrylate, ethoxydiethylene glycol acrylate, methoxytriethylene glycol acrylate, methoxypolyethylene glycol acrylate, methoxydipropylene glycol acrylate, phenoxyethyl acrylate, phenoxypolyethylene glycol acrylate, nonylphenol acrylate, tetrahydrofurfuryl acrylate, isoboronyl acrylate, 2-hydroxyethyl acrylate, 2-hydroxypropyl acrylate, 2-hydroxy-3-phenoxypropyl acrylate, 2-acryloyloxyethyl-succinic acid, 2-acryloyloxyethyl-phthalic acid and 2-acryloyloxyethyl-2-hydroxyethyl-phthalic acid.

Further, the reactive monomer includes reactive monomers in which functional groups such as phosphorus, fluorine, ethylene oxide and propylene oxide are provided to the reactive monomers.

These reactive monomers can be used alone or at least 2 of them can be used in combination for the ink used for the present invention. Among these, difunctional monomers are preferable from the viewpoint that they are superior in toughness and flexibility. Among these difunctional monomers, aliphatic reactive monomers made from hydrocarbon, specifically, such as 1,6-hexanediol diacrylate, neopentylglycol diacrylate, 1,3-butanediol diacrylate, 1,4-butanediol diacrylate and 1,9-nonanediol diacrylate are preferable from the viewpoint of hard yellowing.

The reactive monomer is preferably included by 50 to 85 parts by weight in 100 parts by weight of the ink used for the present invention. When it is less than 50 parts by weight, there is fear that discharge defect is caused because ink viscosity increases, and when it exceeds 85 parts by weight, there is fear that other components necessary for curing are insufficient and curing defect is thus caused.

The reactive oligomer includes urethane acrylate, polyester acrylate, epoxy acrylate, silicon acrylate and polybutadiene acrylate, and it can be used alone and at least 2 of them can be used in combination. Among these, urethane acrylate is preferable from the viewpoint that it is superior in toughness, flexibility and adhesiveness. Among urethane acrylates, aliphatic urethane acrylate containing hydrocarbon is further preferable from the viewpoint of hard yellowing.

The reactive oligomer is preferably included by 1 to 40 parts by weight, more preferably 5 to 40 parts by weight and further preferably 10 to 30 parts by weight in 100 parts by weight of the ink used for the present invention. When the reactive oligomer is 1 to 40 parts by weight, toughness, flexibility and adhesiveness of the ink tend to be able to be further improved.

When the solvent used for the present invention is the reactive monomer and/or reactive oligomer, a photo polymerization initiator can be added to the ink used for the present invention. The photo polymerization initiator includes benzoins, benzyl ketals, amino ketones, titanocenes, bisimidazoles, hydroxy ketones and acylphosphine oxides. They can be used alone or at least 2 of them can be used in combination.

Among the photo polymerization initiators, hydroxy ketones and acylphosphine oxides are preferable from the viewpoints of high reactivity and hard yellowing.

The addition amount of the photo polymerization initiator is preferably 1 to 15 parts by weight and more preferably 3 to 10 parts by weight in 100 parts by weight of the ink used for the present invention. When it is less than 1 part by weight, polymerization is imperfect and there is fear that its film is uncured, and even if it exceeds 15 parts by weight, the improvements of further more curing rate and efficiency of a curing speed cannot be expected and it costs high.

A dispersant for dispersing the pigments may be added to the ink used for the present invention, if necessary. The dispersant includes an anionic surfactant, a cationic surfactant, an ampholytic surfactant, a zwitter ion surfactant and a polymer surfactant, and they can be used alone or at least 2 can be used in combination.

The addition amount of the dispersant to the ink is suitably determined in accordance with a kind of the pigments, but is preferably 5 to 150 parts by weight and more preferably 30 to 80 parts by weight based on 100 parts by weight of the pigments included in the ink. When the dispersant is less than 5 parts by weight, the pigments do not tend to be dispersed well, and when it exceeds 150 parts by weight, the dispersant interrupts inversely the dispersion of the pigments occasionally. Further, ink cost tends to be high.

Additives such as a sensitizer for promoting the initiation reaction of a photo polymerization initiator, a thermal stabilizer, an antioxidant, an antiseptic agent, a deforming agent, penetrating agent, a resin binder, a resin emulsion, a reduction inhibitor, a leveling agent, a pH adjuster, a pigment derivative, a polymerization inhibitor, an ultraviolet absorbent and a photostabilizer can be also further added to the ink used for the present invention, if necessary.

An ink in the ink set for ink jet of the present invention can be obtained by mixing materials to be used, dispersing the mixture thereof using a dispersing machine such as a roll mill, a ball mill, a colloid mill, a jet mill or a bead mill and then carrying out filtration. Among these, a bead mill is preferable because dispersion can be carried out at short time and in large amounts.

A viscosity of the ink used for the present invention is preferably 1 to 20 mPa·s at 30° C. and more preferably 2 to 15 mPa·s when the solvent is water and organic solvent. When the solvent is the reactive monomer and/or reactive oligomer, it is preferably 1 to 20 mPa·s at 50° C. and more preferably 2 to 15 mPa·s. When the viscosity is less than 1 mPa·s, a discharge amount is too much because the viscosity of the ink is too low and there is fear that the discharge of the ink is unstable. When it exceeds 20 mPa·s, there is fear that discharge cannot be carried out because the viscosity of the ink is too high.

The surface tension of the ink at discharge is preferably 15 to 40 dyne/cm and more preferably 20 to 30 dyne/cm in order to correspond to various printing materials. When it is less than 15 dyne/cm, an image tends to bleed because wettability is too good and it becomes hard to feed the ink to a printer head. When it exceeds 40 dyne/cm, the ink is flipped on the material because wettability is deteriorated, and an image tends to be unclear.

An ink jet recording device capable of using the ink set for ink jet of the present invention is not specifically limited. For example, there can be used continuous systems such as a discharge modulation system, a microdot system, a discharge jet control system and an ink mist system, and on-demand systems such as a stemme system, a pulse jet system, a bubble jet (registered trade mark) system and an electrostatic suction system.

When the ink used for the present invention is used in the above-mentioned ink jet recording device, the ink may be discharged by providing a heater on a head loaded on the ink jet recording device and lowering ink viscosity by heating the ink. The heating temperature of the ink is preferably 25 to 150° C. and more preferably 30 to 70° C. When the reactive monomer and/or reactive oligomer is used as a solvent, the heating temperature of the ink is determined by considering the curing property for heat of the reactive monomer and/or reactive oligomer and is set at a lower temperature than the temperature at which curing starts by heating.

As the condition of the irradiation of ultraviolet rays for curing the reactive monomer and/or reactive oligomer included in the ink used for the present invention, the output of an ultraviolet ray lamp is preferably 50 to 280 W/cm, and more preferably 80 to 200 W/cm. When the output of the ultraviolet ray lamp is less than 50 W/cm, the ink does not tend to be adequately cured because of insufficiency of the peek intensity and integrated light quantity of the ultraviolet rays, and when it exceeds 280 W/cm, a coloring medium is deformed or melted by the heat of the ultraviolet ray lamp, and further, the cured film of the ink tends to be deteriorated.

The irradiation time of ultraviolet rays is preferably 0.1 to 20 sec and more preferably 0.5 to 10 sec. When the irradiation time of ultraviolet rays is longer than 20 sec, a coloring medium is deformed or melted by the heat of the ultraviolet ray lamp, and further, the cured film of the ink tends to be deteriorated, and when it is shorter than 0.1 sec, the integrated light quantity of ultraviolet rays is insufficient and the ultraviolet curing ink does not tend to be adequately cured.

A coloring medium that the ink jet coloring process of the present invention can use includes flexible substrates such as fibers, leathers, films, papers and metal foils, plastics, ceramics, glasses, timber and metals and is not specifically limited.

Pretreatment such as primer processing can be also carried out for the coloring medium according to necessity. Further, the coloring medium can be also preliminarily prepared by pale color in similar colors as a printing image. A printed portion fits in an unprinted portion by preparing it with pale color in similar colors as a printing image, and printed articles look naturally. Further, post process such as top coating or emboss process can be also carried out for the printed articles after printing and is not specifically limited.

The coloring medium for the purpose of outdoor use is preferably metals and ceramics. The metals are not specifically limited and include plated steel plates such as a normal steel plate and a galvalume steel plate, steel plates such as a coated steel plate and a stainless steel plate, an aluminum plate and a copper plate. Further, an example includes also a PCM steel plate in which various resin coatings were carried out as under coating layers on metals in the same manner as a metal siding material.

Further, unevenness such as tile tone, brick tone and woodgrain may be carried out for the metal siding material by embossing process and draw molding process. Further, a rear face may be coated with a rear face material such as aluminum laminated craft paper, using an inorganic material such as a plaster board and a resin foamed article as core material, in order to provide thermal insulating properties and sound insulation.

The ceramics are not specifically limited, but include an unglazed ceramic plate (water-absorbing), a glazed and baked ceramic plate (non water-absorbing) and a cement plate. Further, they include those that were molded in a plate shape using a cement raw material and a fibrous raw material as a ceramic siding material. Unevenness such as tile tone, brick tone and woodgrain may be carried out for the ceramic siding material by embossing process.

The thickness and shape of the coloring medium are also not specifically limited and can be suitably set in accordance with use, a place to be used and form.

An imparting amount of the ink to the coloring medium is preferably 1 to 100 g/m$^2$ and more preferably 1 to 50 g/m$^2$. When it is less than 1 g/m$^2$, adequate coloring tends to be difficult and when it exceeds 100 g/m$^2$, bleed of the ink and curing defect tend to be caused because the imparting amount is too much.

Since the ink in the ink set for ink jet of the present invention is extremely excellent in weather resistance, it can be preferably used for those used out of doors such as exterior materials of a building, an advertising display and a signage, in particular.

Even if a colored product in which a coloring pattern is formed using the ink jet coloring process of the present invention is used out of doors, discoloring is hardly observed because the ink used for the ink set of the present invention has weather resistance.

In the colored product for outdoor use in which a coloring pattern is formed using the ink jet coloring process of the present invention, the thickness of an ink layer with coloring pattern is preferably 1 to 150 μm. When it is thinner than 1 μm, it tends to be difficult to obtain adequate coloring, and when it exceeds 150 μm, the crack and peeling of the ink layer tend to be generated because the ink layer is too thick.

The formation of coloring pattern to the coloring medium of a colored product for outdoor use can be carried out using the above-described ink jet recording device. The coloring pattern can be also formed on the whole face of the medium and the coloring pattern can be also partially formed on the medium. Examples of the coloring pattern include brick pattern and woodgrain pattern. The brick pattern is a pattern in which a plurality of bricks (sites shown by the reference symbols 1a and 1b in FIG. 1) are laminated as shown in FIG. 1.

When the ink used for the present invention includes the reactive monomer and/or the reactive oligomer being an ultraviolet curing resin as a solvent, the ink layer with coloring pattern that is formed on the coloring medium of a colored article for outdoor is superior in adhesiveness with the medium, therefore, it is hardly peeled even if embossing process and folding process are carried out as a post process.

EXAMPLES

The coloring pattern related to the present invention is illustrated below according to Examples while referring to the attached drawing, but the invention is not limited thereto.

Example 1

[Preparation of Orange Pigment Ink]

3 Parts by weight of Sicotrans Red L2818 (C. I. Pigment Red 101, iron oxide available from BASF Japan Ltd.) being an inorganic pigment, 3 parts by weight of a dispersant (Disperbyk-168 available from Byk Chemie Ltd.), 20 parts by weight of a reactive oligomer (CN 985 B88, aliphatic urethane acrylate, difunctional, available from Sartomer Co., Inc.), 69 parts by weight of a reactive monomer (SR238F, 1,6-hexanediol diacrylate, difunctional, available from Sartomer Co., Inc.) and 5 parts by weight of a photo polymerization initiator (IRGACURE 2959, 1-[4-(2-hydroxyethoxy)-phenyl]2-hydroxy-2-methyl-1-propan-1-on, available from Ciba Specialty Chemicals Co., Ltd.) were added, the mixture was dispersed using a bead mill dispersing machine, and then, impurities were removed by filtration to prepare a homogeneous orange pigment ink. The average particle diameter of the inorganic pigment used was 79 nm.

[Preparation of Red Pigment Ink]

A red pigment ink was prepared in the same manner as the above-described orange pigment ink except that IRGAZIN Red 179 (C. I. Pigment Red 179, condensed polycyclic compound, available from Ciba Specialty Chemicals Co., Ltd.) serving as an organic pigment was used in place of the inorganic pigment. The average particle diameter of the organic pigment used was 154 nm.

[Preparation of Blue Pigment Ink]

A blue pigment ink was prepared in the same manner as the above-described orange pigment ink except that IRGALITE Blue GLO (C. I. Pigment Blue 15:3, copper phthalocyanine, available from Ciba Specialty Chemicals Co., Ltd.) being an organic pigment was used in place of the inorganic pigment. The average particle diameter of the organic pigment used was. 112 nm.

[Preparation of Black Pigment Ink]

A black pigment ink was prepared in the same manner as the above-described orange pigment ink except that N1Pex 35 (C. I. Pigment Black 7, carbon, available from Degussa Japan Corporation) was used as a pigment.

The orange pigment ink, red pigment ink, blue pigment ink and black pigment ink that were obtained were prepared as an ink set, it was provided for a coloring medium by an ink jet printer at the following conditions and a colored product was obtained by curing the ink by an ultraviolet ray lamp.

[Coloring Medium]

Ceramic plate A: a product with a thickness of 15 mm being coated with an acryl overcoat coating material on which an acryl sealer coating material and overcoat coating material were coated was used. A pigment was formulated in the overcoat coating material so as to be white color.

Ceramic plate B: a product with a thickness of 15 mm being coated with an acryl overcoat coating material on which an acryl sealer coating material and an overcoat coating material were coated was used. A pigment was formulated in the overcoat coating material so as to be ivory color.

[Printing Conditions]
Nozzle diameter: 70 μm
Applied voltage: 50 V
Pulse width: 20 μs
Drive frequency: 3 kHz
Resolution: 360 dpi
Heating temperature: 60° C.

[Irradiation Conditions of Ultraviolet Rays]
Kind of lamp: Metal halide lamp
Voltage: 200 W/cm
Irradiation time: 1 sec
Irradiation distance: 10 cm Those described below were obtained as a colored product.

(Colored Product A)

Matrix pattern was printed by discharging the equal amounts of the orange pigment ink and the red pigment ink at the imparting amounts (g/m$^2$) described in Table 1 on a ceramic plate A, to obtain the colored product A. The matrix pattern herein is a pattern in which zones respectively colored in square were arranged in parallel at a fixed interval.

TABLE 1

| | Ink-imparting amount (g/m$^2$) | | | |
|---|---|---|---|---|
| | R1 | R2 | R3 | R4 |
| Orange pigment ink | 5 | 10 | 15 | 20 |
| Red pigment ink | 5 | 10 | 15 | 20 |

(Colored Product B)

Brick tone pattern was printed by discharging the total amount of the orange pigment ink, red pigment ink, blue pigment ink and black pigment ink at the imparting amount of 17 (g/m$^2$) on a ceramic plate B, to obtain the colored product B. FIG. 1 is an illustration diagram of an image that was used in discharging the ink on the ceramic plate B and printing brick pattern by using the ink set of the present invention. The color separation of the image was carried out in the color of the used ink and was printed.

In FIG. 1, the reference symbols 1a and 1b show one brick respectively and the reference symbol 2 shows a joint that is a boundary zone between a plurality of laminated bricks 1a(1b). The ink is not provided at the joint portion of the reference symbol 2 and the overcoating portion of the ceramic plate is exposed. The portion of the reference symbol 1a was printed at the ink-imparting proportion described in 1a of Table 2 so as to be high density, and the portion of the reference symbol 1b was printed at the ink-imparting proportion described in 1b of Table 2 so as to be low to middle density (higher density than the reference symbol 2 and lower density than the reference symbol 1a).

TABLE 2

|  | Ink-imparting proportion (%) | |
| --- | --- | --- |
|  | 1a | 1b |
| Orange pigment ink | 20 to 80 | 10 to 50 |
| Red pigment ink | 20 to 80 | 10 to 50 |
| Blue pigment ink | 0 to 20 | 0 to 10 |
| Black pigment ink | 0 to 20 | 0 to 10 |

[Evaluation of Color Representation of Colored Product A]

The colors of 4 zones (R1 to R4) of the colored product A were respectively measured by the L*C*h color system, using a spectrophotometric calorimeter (CM-3600d manufactured by Konica Minolta Sensing Inc.). The color representation of the colored product A was evaluated by chroma saturation C* and hue angle h. The result is shown in Table 3. The color representation of the colored product B was similarly evaluated and the result is shown in Table 4.

[Evaluation of Weather Resistance]

The weather resistance of the colored product B was tested by a promoting weather resistance tester; Metal Weather (manufactured by Dieprawintes Co.). The weather resistance was carried out at the following test condition.

Light source: Water-cooling type metal halide lamp
Illuminance: 100 mW/cm$^2$
Wavelength: 295 to 450 nm.
Temperature: 60° C. (irradiation) and 30° C. (dew drop)
Humidity: 50% (irradiation) and 90% (dew drop)
Cycle: 5 hours for irradiation and 5 hours for dew drop
Shower: 10 sec before and after dewdrop
Test time: 250 hours The weather resistance of the colored product B was evaluated as discoloration of color (light resistance of pigment). Namely, color difference before and after the weather resistance test was evaluated based on gray scale for discoloration (JIS L 0804) at 9 stages. The result is shown in Table 5. The nine stages are composed of 5, 4-5, 4, 3-4, 3, 2-3, 2, 1-2 and 1, a case having no color difference is evaluated as 5, a value is lowered in accordance with the enlargement of color difference and a case of the maximum color difference is evaluated as 1.

Example 2

[Preparation of Orange Pigment Ink]
An orange pigment ink was prepared in the same manner as Example 1.
[Preparation of Red Pigment Ink]
A red pigment ink was prepared in the same manner as Example 1 except that 130ED (C. I. Pigment Red 101, iron oxide, available from Toda Kogyo Corporation) being an inorganic pigment was used as a pigment. The average particle diameter of the inorganic pigment used was 170 nm.
[Preparation of Blue Pigment Ink]
A blue pigment ink was prepared in the same manner as Example 1.
[Preparation of Black Pigment Ink]
A black pigment ink was prepared in the same manner as Example 1.

The orange pigment ink, red pigment ink, blue pigment ink and black pigment ink that were obtained were prepared as an ink set, and the ink was discharged on a ceramic plate in the same manner as Example 1. Matrix pattern was printed on a ceramic plate A, to obtain the colored product D. Further, brick tone pattern was printed on a ceramic plate B, to obtain the colored product E. The ink-imparting amount for the coloring medium in the preparation of brick tone pattern was 19 g/m$^2$ (total amount). The color representation of the colored products D and E and the weather resistance of the colored product E were evaluated in the same manner as Example 1. The result of the color representation of the colored product D is shown in Table 3, and the results of the color representation and weather resistance of the colored product E are respectively shown in Tables 4 and 5.

Example 3

[Preparation of Orange Pigment Ink]
An orange pigment ink was prepared in the same manner as Example 1.
[Preparation of Red Pigment Ink]
A red pigment ink was prepared in the same manner as Example 1 except that PV FAST RED B (C. I. Pigment Red 149, condensed polycyclic compound, available from Clariant Japan Co., Ltd.) being an organic pigment was used as a pigment. The average particle diameter of the organic pigment used was 35 nm.
[Preparation of Blue Pigment Ink]
A blue pigment ink was prepared in the same manner as Example 1.
[Preparation of Black Pigment Ink]
A black pigment ink was prepared in the same manner as Example 1.

The orange pigment ink, red pigment ink, blue pigment ink and black pigment ink that were obtained were prepared as an ink set, and the ink was discharged on a ceramic plate in the same manner as Example 1. Matrix pattern was printed on a ceramic plate A, to obtain the colored product F. Further, brick tone pattern was printed on a ceramic plate B, to obtain the colored product G. The ink-imparting amount for the coloring medium in the preparation of brick tone pattern was 21 g/m$^2$ (total amount). The color representation of the colored products F and G and the weather resistance of the colored product G were evaluated in the same manner as Example 1. The result of the color representation of the colored product F is shown in Table 3, and the results of the color representation and weather resistance of the colored product G are respectively shown in Tables 4 and 5.

Example 4

[Preparation of Orange Pigment Ink]
An orange pigment ink was prepared in the same manner as Example 1.
[Preparation of Red Pigment Ink]
A red pigment ink was prepared in the same manner as Example 1 except that Paliogen Red L3910D (C. I. Pigment Red 178, condensed polycyclic compound, available from BASF Japan Ltd.) being an organic pigment was used as a pigment. The average particle diameter of the organic pigment used was 172 nm.
[Preparation of Blue Pigment Ink]
A blue pigment ink was prepared in the same manner as Example 1.
[Preparation of Black Pigment Ink]
A black pigment ink was prepared in the same manner as Example 1.

The orange pigment ink, red pigment ink, blue pigment ink and black pigment ink that were obtained were prepared as an ink set, and the ink was discharged on a ceramic plate in the same manner as Example 1. Matrix pattern was printed on a ceramic plate A to obtain the colored product H. Further, brick tone pattern was printed on a ceramic plate B to obtain the colored product I. The ink-imparting amount for the coloring medium in the preparation of brick tone pattern was 19 g/m$^2$ (total amount). The color representation of the colored products H and I and the weather resistance of the colored product I were evaluated in the same manner as Example 1. The result of the color representation of the colored product H is shown in Table 3, and the results of the color representation and weather resistance of the colored product I are respectively shown in Tables 4 and 5.

Example 5

[Preparation of Orange Pigment Ink]

3 Parts by weight of Sicotrans Red L2818 (C. I. Pigment Red 101, iron oxide, available from BASF Japan Ltd.) being an inorganic pigment, 5 parts by weight of a dispersant (HPD-96 available from BASF Japan Ltd.), 10 parts by weight of a binder (Johncryl 741 available from BASF Japan Ltd.), 3 parts by weight of a wetting agent (propylene glycol available from Showa Denko K., K.), 1 part by weight of a wetting agent (urea available from Mitsui Chemicals Inc.) and 78 parts by weight of pure water were added, the mixture was dispersed using a bead mill dispersing machine, and then, impurities were removed by filtration to prepare homogeneous orange pigment ink. The average particle diameter of the inorganic pigment used was 79 nm.

[Preparation of Red Pigment Ink]

Red pigment ink was prepared in the same manner as the orange pigment ink (Example 5) except that IRGAZIN Red 179 (C. I. Pigment Red 179, condensed polycyclic compound available from Ciba Specialty Chemicals Co., Ltd.) being an organic pigment was used in place of the inorganic pigment. The average particle diameter of the organic pigment used was 154 nm.

[Preparation of Blue Pigment Ink]

Blue pigment ink was prepared in the same manner as the orange pigment ink (Example 5) except that IRGALITE Blue GLO (C. I. Pigment Blue 15:3, copper phthalocyanine available from Ciba Specialty Chemicals Co., Ltd.) being an organic pigment was used in place of the inorganic pigment.

[Preparation of Black Pigment Ink]

Black pigment ink was prepared in the same manner as the orange pigment ink (Example 5) except that NIPex 35 (C. I. Pigment Black 7, carbon available from Degussa Japan Corporation) being an inorganic pigment was used as a pigment.

The orange pigment ink, red pigment ink, blue pigment ink and black pigment ink that were obtained were prepared as an ink set, and the ink was discharged on a ceramic plate in the same manner as Example 1. Matrix pattern was printed on a ceramic plate A, to obtain the colored product J. Further, brick tone pattern was printed on a ceramic plate B, to obtain the colored product K. The ink-imparting amount for the coloring medium in the preparation of brick tone pattern was 20 g/m$^2$ (total amount). The color representation of the colored products J and K and the weather resistance of the colored product K were evaluated in the same manner as Example 1. The result of the color representation of the colored product J is shown in Table 3, and the results of the color representation and weather resistance of the colored product K are respectively shown in Tables 4 and 5.

Example 6

[Preparation of Orange Pigment Ink]

3 Parts by weight of Sicotrans Red L2818 (C. I. Pigment Red 101, iron oxide, available from BASF Japan Ltd.) being an inorganic pigment, 2 parts by weight of a dispersant (Johncryl 611, available from BASF Japan Co., Ltd.), 10 parts by weight of a binder (styrene-acrylic acid-methacrylic acid resin), 55 parts by weight of methyl ethyl ketone and 30 parts by weight of isopropyl alcohol were added, the mixture was dispersed using a bead mill dispersing machine, and then impurities were removed by filtration to prepare a homogeneous orange pigment ink. The average particle diameter of the inorganic pigment used was 79 nm.

[Preparation of Red Pigment Ink]

A red pigment ink was prepared in the same manner as the orange pigment ink (Example 6) except that IRGAZIN Red 179 (C. I. Pigment Red 179, condensed polycyclic compound, available from Ciba Specialty Chemicals Co., Ltd.) being an organic pigment was used in place of the inorganic pigment. The average particle diameter of the organic pigment used was 154 nm.

[Preparation of Blue Pigment Ink]

A blue pigment ink was prepared in the same manner as the orange pigment ink (Example 6) except that IRGALITE Blue GLO (C. I. Pigment Blue 15:3, copper phthalocyanine, available from Ciba Specialty Chemicals Co., Ltd.) being an organic pigment was used in place of the inorganic pigment.

[Preparation of Black Pigment Ink]

A black pigment ink was prepared in the same manner as the orange pigment ink (Example 6) except that NIPex 35 (C. I. Pigment Black 7, carbon, available from Degussa Japan Corporation) being an inorganic pigment was used as a pigment.

The orange pigment ink, red pigment ink, blue pigment ink and black pigment ink that were obtained were prepared as an ink set, and the ink was discharged on a ceramic plate in the same manner as Example 1. Matrix pattern was printed on a ceramic plate A to obtain the colored product L. Further, brick tone pattern was printed on a ceramic plate B to obtain the colored product M. The ink-imparting amount for the coloring medium in the preparation of brick tone pattern was 21 g/m$^2$ (total amount). The color representation of the colored products L and M and the weather resistance of the colored product M were evaluated in the same manner as Example 1. The result of the color representation of the colored product L is shown in Table 3, and the results of the color representation and weather resistance of the colored product M are respectively shown in Tables 4 and 5.

Comparative Example 1

[Preparation of Yellow Pigment Ink]

A yellow pigment ink was prepared in the same manner as Example 1 except that DAIPYROXIDE YELLOW 9151 (C. I. Pigment Brown 24, composite oxide (titanium-antimony-chromium) available from Dainichiseika Colour & Chemicals Mgf. Co., Ltd.) being an inorganic pigment was used as a pigment. The average particle diameter of the inorganic pigment used was 101 nm.

[Preparation of Red Pigment Ink]

A red pigment ink was prepared in the same manner as Example 1.

[Preparation of Blue Pigment Ink]

A blue pigment ink was prepared in the same manner as Example 1.

[Preparation of Black Pigment Ink]

A black pigment ink was prepared in the same manner as Example 1.

The yellow pigment ink, red pigment ink, blue pigment ink and black pigment ink that were obtained were prepared as an ink set, and the ink was discharged on a ceramic plate in the same manner as Example 1. Matrix pattern was printed on a ceramic plate A to obtain the colored product R. Further, brick tone pattern was printed on a ceramic plate B to obtain the colored product S. The ink-imparting amount for the coloring medium in the preparation of brick tone pattern was 18 g/m² (total amount). The color representation of the colored products R and S and the weather resistance of the colored product S were evaluated in the same manner as Example 1. The result of the color representation of the colored product R is shown in Table 3, and the results of the color representation and weather resistance of the colored product S are respectively shown in Tables 4 and 5.

Table 3 shows the result that the color representation of the colored products with matrix pattern was evaluated by the chroma saturation C* and hue angle h.

TABLE 3

|  |  | Ex. No. |  |  |  |  |  | Com. Ex. 1 |
| --- | --- | --- | --- | --- | --- | --- | --- | --- |
|  |  | 1 | 2 | 3 | 4 | 5 | 6 |  |
|  |  | Colored product No. |  |  |  |  |  |  |
|  |  | A | D | F | H | J | L | R |
| Chroma saturation C* | R1 | 33.3 | 29.5 | 34.0 | 33.7 | 33.1 | 33.0 | 27.3 |
|  | R2 | 48.2 | 44.8 | 49.0 | 48.9 | 47.9 | 48.3 | 40.7 |
|  | R3 | 54.9 | 49.9 | 55.9 | 55.3 | 55.3 | 54.7 | 47.4 |
|  | R4 | 63.5 | 58.7 | 64.3 | 63.8 | 62.7 | 63.0 | 50.1 |
| Hue angle h | R1 | 46.0° | 48.7° | 45.2° | 42.2° | 45.8° | 46.1° | 50.9° |
|  | R2 | 45.1° | 47.4° | 44.6° | 41.6° | 45.0° | 44.8° | 44.4° |
|  | R3 | 43.8° | 46.2° | 43.2° | 40.9° | 43.9° | 43.6° | 40.8° |
|  | R4 | 42.9° | 45.6° | 42.5° | 40.0° | 43.1° | 43.2° | 38.7° |

Table 4 shows the result of evaluation of the color representation of the colored products with brick tone pattern by the chroma saturation C* and hue angle h.

TABLE 4

| Ex. No. | Colored product No. | Chroma saturation C* | Hue angle h |
| --- | --- | --- | --- |
| 1 | B | 32 to 51 | 32° to 64° |
| 2 | E | 28 to 47 | 41° to 63° |
| 3 | G | 30 to 56 | 31° to 65° |
| 4 | I | 33 to 54 | 28° to 64° |
| 5 | K | 31 to 50 | 33° to 64° |
| 6 | M | 32 to 50 | 31° to 65° |
| Com. Ex. 1 | S | 23 to 39 | 30° to 83° |

Table 5 showed the weather resistance of the colored products with brick tone pattern.

TABLE 5

|  | Ex. No. |  |  |  |  |  | Com. Ex. 1 |
| --- | --- | --- | --- | --- | --- | --- | --- |
|  | 1 | 2 | 3 | 4 | 5 | 6 |  |
|  | Colored product No. |  |  |  |  |  |  |
|  | B | E | G | I | K | M | S |
| Weather resistance | 4 | 4 | 4 | 4 | 4 | 4 | 4 |

According to Table 3, it is grasped that chroma saturation C* is heightened in accordance with the increase of the ink-imparting amount for the coloring medium in the matrix patterns of Examples 1 to 6 and brightness is increased. Further, it is grasped that since the fluctuation of the hue angle h is small, hue change is small. Namely, it is indicated in Examples 1 to 6 that dense orange color can be represented. On the other hand, it is grasped in Comparative Example 1 that even if the ink-imparting amount is increased, the enhancement of the chroma saturation is small and brightness in accordance with the ink-imparting amount is not obtained. Further, it is grasped that when the ink-imparting amount is increased, the hue is deviated to a red direction. Namely, it can be said that dense orange representation is impossible in Comparative Example 1.

According to Table 4, it is grasped that the colored products with brick tone pattern obtained in Examples 1 to 6 are warm colored products having red color to orange color from the range of the hue angle h, and since they show high chroma saturation C*, they have brick tone pattern superior in bright warm color representation. On the other hand, it is grasped that the colored product with brick tone pattern obtained in Comparative Example 1 is slightly grave color tone because the chroma saturation C* is low in comparison with Examples.

According to visual evaluation, the colored products with brick tone pattern obtained in Examples 1 to 6 were warm colored products having bright color and dense color that were color gamut from red color to orange color. Further, the colored products with brick tone similar to a genuine brick could be prepared owing to a synergy effect of color representation by 4-color pigment ink. Further, the colored products with brick tone having convex feeling close to a genuine brick could be prepared in Examples 1, 2, 3 and 4 by using UV ink.

According to Table 5, it is grasped that the colored products obtained in Examples 1 to 6 have hardly color difference before and after weather resistance test and light resistance is high.

What is claimed is:

1. An ink set for ink jet comprising an orange pigment ink (a) and a red pigment ink (b), wherein the orange pigment ink (a) comprises iron oxide orange pigment and a solvent, and the red pigment ink (b) comprises at least one of iron oxide red pigment and condensed polycyclic compound red pigment, and a solvent.

2. The ink set for ink jet of claim 1, wherein the iron oxide orange pigment is C. I. Pigment Red 101.

3. The ink set for ink jet of claim 1, wherein the average particle diameter of the iron oxide orange pigment is 10 to 90 nm.

4. The ink set for ink jet of claim 1, wherein the iron oxide red pigment is selected from the group consisting of C. I. Pigment Red 101, C. I. Pigment Red 102, and a combination of C.I. Pigment Red 101 and Red 102, and the condensed polycyclic compound red pigment is selected from the group consisting of C. I. Pigment Red 149, C. I. Pigment Red 168, C. I. Pigment Red 178, C. I. Pigment Red 179, C. I. Pigment Red 190, Pigment Red 224, C. I. Pigment Red 242, C. I. Pigment Red 254, C. I. Pigment Red 255, C. I. Pigment Red 270 and C. I. Pigment Red 272.

5. The ink set for ink jet of claim 1 to form an image, wherein each of the solvents is at least one solvent selected from the group consisting of a reactive monomer and/or a reactive oligomer.

6. An ink jet coloring process, wherein a pattern is formed in a coloring medium using the ink set for ink jet of claim 1.

7. A colored product for outdoor, which is obtained by using the ink jet coloring process of claim 6.

* * * * *